Dec. 28, 1965         A. H. REUTHER         3,226,151
ELECTRICALLY-OPERABLE VISOR SYSTEMS
Filed July 31, 1963                     4 Sheets-Sheet 2

INVENTOR.
Albert H. Reuther

Dec. 28, 1965   A. H. REUTHER   3,226,151
ELECTRICALLY-OPERABLE VISOR SYSTEMS
Filed July 31, 1963   4 Sheets-Sheet 3

INVENTOR.
Albert H. Reuther

Dec. 28, 1965  A. H. REUTHER  3,226,151
ELECTRICALLY-OPERABLE VISOR SYSTEMS
Filed July 31, 1963  4 Sheets-Sheet 4

INVENTOR.
Albert H. Reuther

United States Patent Office 3,226,151
Patented Dec. 28, 1965

3,226,151
ELECTRICALLY-OPERABLE VISOR SYSTEMS
Albert H. Reuther, Dayton, Ohio, assignor to General Motors Corporation, Detroit, Mich., a corporation of Delaware
Filed July 31, 1963, Ser. No. 299,044
20 Claims. (Cl. 296—97)

This invention relates to sun-glare visor actuation and, more particularly, to electrically-operable sun visor systems for use on vehicles such as bus, truck and car bodies and the like.

An object of this invention is to provide a new and improved mobile visor means which is motor driven through suitable force-transmitting connection and in response to actuation from an electrical signal either from an adjustable body-supported photo cell or electronic pickup carried for vehicle occupants eyelevel adjustment as to angulation of entry of light rays and the like or from a dashboard or steering-means-mounted multi-position switching device which can be set to vehicle operator selection manually as well as overriding the electronic pickup and optionally with an electrically operable vehicle ride-height suspension-control-like switching means provided between sprung and unsprung masses of a vehicle.

Another object of this invention is to provide, in combination, a motorized visor means movable to and fro by force-transmitting connection and in response to electrical energization from a vehicle energy source such as a battery and/or generator means, and an automatic control means for headlight dimming usable during daylight by selective sensitivity setting for triggering electrically motorized operation of sunvisor means.

Another object of this invention is to provide, in combination, a motorized visor means movable to and fro by force-transmitting connection and in response to actuation from an electrical signal either automatically from an adjustable body-supported photo cell or electronic pickup carried for vehicle occupant eyelevel adjustment as to angulation of entry of bright sunrays of light and the like of predetermined intensity value or manually from a dashboard or steering-means-mounted multi-position switch means which can be set to vehicle occupant selection of positioning of the motorized visor means.

A further object of this invention is to provide, in combination, a motorized visor means movable to and fro by force-transmitting connection such as rack and pinion as well as worm gearing and in response to actuation from an electrical signal from a vertically adjustable body-supported photo cell or electronic pickup carried for occupant eyelevel adjustment as to angulation of entry of bright sunrays of light and the like.

Another object of this invention is to provide a vehicle having a sprung mass with a load-carrying area which when filled causes downward deflection toward an unsprung mass thereby affecting passage of light rays into line of vision of vehicle occupant subject to shielding automatically involving electrical switch operations due to load change of positioning between the sprung and unsprung masses and consequent electrical energization of motorized sunvisor means movable to and fro as to transparent viewing locations within the vehicle.

Further objects and advantages of the present invention will be apparent from the following description, reference being had to the accompanying drawings wherein preferred embodiments of the present invention are clearly shown.

On many vehicles there has been an increase in the transparent viewing areas of passenger compartments such that at times early in the morning as well as later in the afternoon there can be considerable brightness and sun glare in the eyes of vehicle occupants. It is noted that at many times traffic conditions are such that an operator or driver is too occupied to divert his attention to positioning of sunvisor means and the like. Generally, a vehicle operator must strive to maintain his vision in a direction in which he is going and by reaching up to a visor means with a hand, it often occurs that an arm or elbow obstructs the view and line of vision through a windshield for example. Thus the operator is faced not only with the bright light from the rays of the sun, but also there is a physical obstruction to his line of vision due to the hand or arm which previously necessarily had to reach upwardly in front of the operator or passenger and the corresponding line of vision. Thus a remote-controlled and even automatically actuated visor operating means is desirable and advantageous for safety reasons as well as convenience and comfort.

Figure 1:
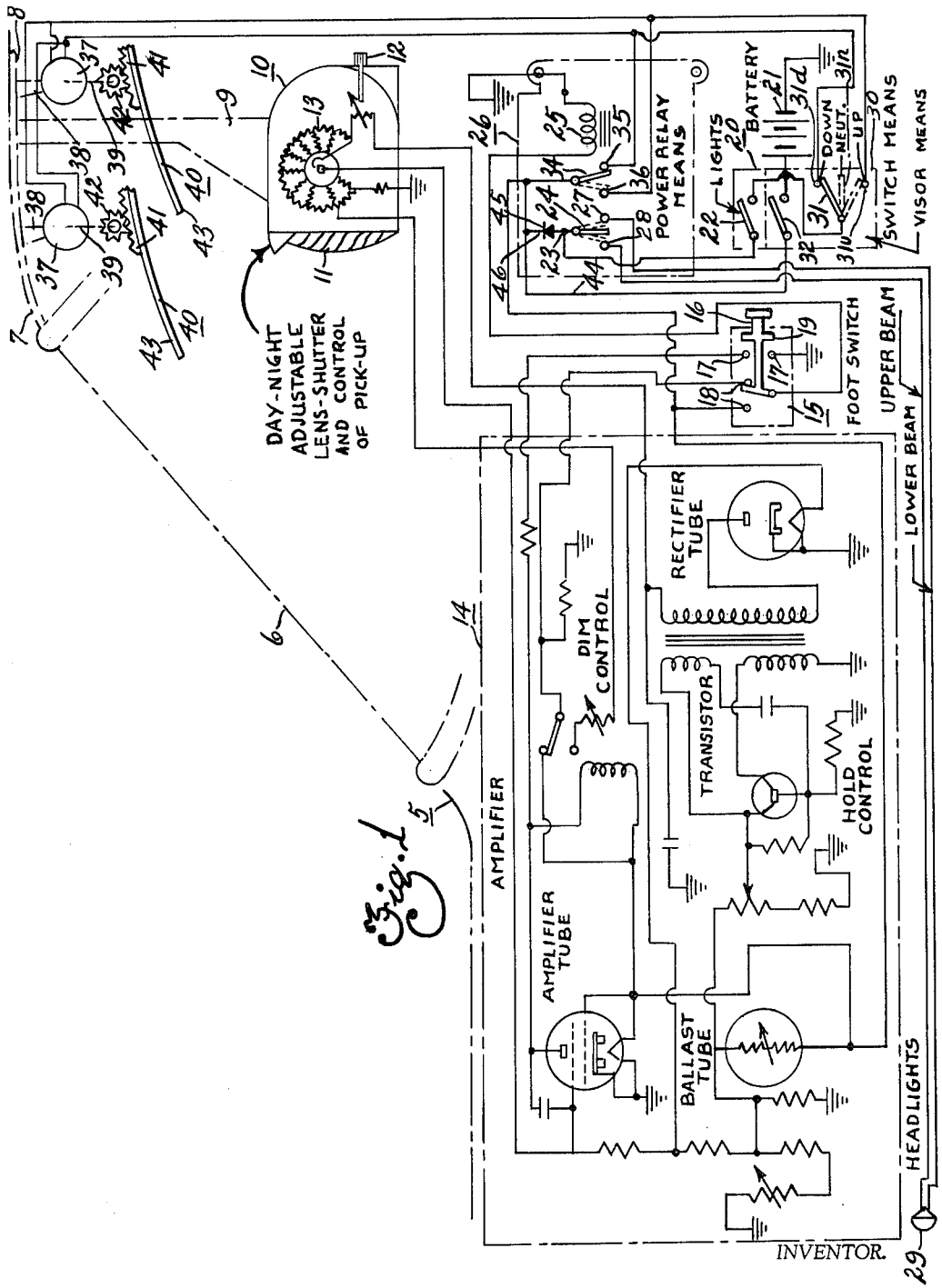
FIGURE 1 is a fragmentary and diagrammatic illustration of a vehicle having a photo cell or electronic pickup means and sensitivity control combined with electrically operable sunvisor means in accordance with the present invention.

Accordingly, in FIGURE 1 there is shown a vehicle body generally indicated by numeral 5 having a transparent viewing area or glass windshield means 6 as well as a roof portion 7 in a well known manner. This roof portion can include a frame or support 8 relative to which the windshield is mounted. A downwardly extending bracket 9 indicated in FIGURE 1, can have one end thereof secured to a roof portion or the support 8 and an opposite end thereof can carry a housing of a photo cell or electronic pickup means generally indicated by numeral 10 in FIGURE 1. This pickup means can include a forwardly disposed lens portion 11 as well as a rearwardly located adjustable control 12 for sensitively setting as to a printed network of resistive impedance 13 of a photo tube unit. This network of the photo tube unit receives light signals transferred to an amplifier means generally indicated by numeral 14. This amplifier means 14 includes circuitry and components for transforming the light signals into usable electrical energization of high and low beam headlight filaments and/or for electrically-operable visor systems in accordance with the present invention. The specific circuitry of the amplifier means 14 shown in FIGURE 1 is provided as an example only. Reference can be made to a "Service and Shop Manual for Chevrolet Radio and Autronic Eye" copyrighted in 1958, and on page 68 thereof, providing description and data for such amplifier means. Other amplifier means useful for purposes of this invention could be taken from disclosures of patents belonging to the assignee of the present invention. These patents of the assignee cited for purposes of illustration are, 2,808,539—Onksen et al., issued October 1, 1957 and 2,829,307—Miller et al., issued April 1, 1958, as well as 2,835,847—Guyton, issued May 20, 1958 on an Automatic Headlamp Dimmer System per se and, 3,026,446—Martin et al., issued March 20, 1962 on an Automatic Headlamp Control System per se. The disclosures of these patents relate chiefly to features of circuitry for headlight dimmer control and generally provide a foot switch means generally indicated by numeral 15 including an actuator 16 shown also in FIGURE 1 of the drawings representing an override contact means 17 as well as automatic contact means 18 for the headlamp control portion of circuitry of FIGURE 1. The override contact 17 can be bridged by a portion 19 of the actuator 16 so that high or upper beam lights can be energized at night in accordance with an operator's choice or need regardless of the automatic headlamp control system by way of the amplifier means 14 for example. Such operator overriding of automatic headlamp control systems is well known and forms no part per se of the present invention.

However, the automatic headlamp control system including the sensitivity adjustment 12 for the photo tube network 13 can be provided with a day and night setting, for example, such that impedance values can be adjusted accordingly for sensing relatively bright and strong rays of sunlight or glare therefrom as well as oncoming bright headlights at night. Day or night sensitivity adjustments by the control portion 12 of the photo tube unit 10 could be accomplished electrically by variation of impedance as well as physically by an optical mirror-like positioning or change in configuration of lens 11 for example, so as to polarize or filter or deflect rays of daylight differently from upward directions rather than for oncoming headlight glare at night which generally enters at a lower angle. In any event, the adjustable control portion 12 can be utilized, or physical lens structure 11 could be rotated as a shutter or gate which determines the brightness of light used for triggering the automatic headlamp control system at night and for converting the same to daytime use to have electrically-operable visor means.

Switch means generally indicated by numeral 20 in FIGURE 1, can be provided for connecting a battery or source of power, generally indicated by numeral 21, for electrical energization of headlight means as well as electrically-operable visor means. The switch means 20 can include a master manual headlight switch arm 22 which when closed will interconnect the battery by a suitable wiring with a juncture 23 and a plunger or lever-like armature 24. This switch arm 24 can be caused to shift in position due to energization of a coil or solenoid 25 of a power relay means, generally indicated by numeral 26. The coil or solenoid 25 can be duplicated if necessary for an additional switch arm, noted subsequently herein, though the same coil or solenoid can be utilized for more than one lever arm to be shifted in positioning as to predetermined contacts. The lever arm 24 can be positioned either in engagement with a lower beam contact 27 or a higher beam contact 28 for a headlight means 29 to energized accordingly.

The switch means 20 can further include a visor portion 30 thereof having a first movable switch segment 31 as well as a second movable switch segment 32. The first switching segment 31 can engage an "up" contact $31_u$ or a "down" contact $31_d$ for purposes noted in greater detail subsequently herein.

The second switch segment 32 serves to arm or energize the automatic visor control means by a wiring connection to a switch arm 34 movable between a contact 35 for "down" energization and a contact 36 for "up" energization of motor means 37 of the electrically-operable visor system. The motor means 37 can be suitably mounted or carried by the roof-support 8 of the vehicle such as by brackets 38 indicated in FIGURE 1. Each motor means includes a stator winding portion and armature journaled by a shaft 39 which drives movable visor means, generally indicated by numeral 40. The visor means 40 can include a rack or toothed portion 41 engaged by the gear 42 mounted on a free end of shaft means 39. The visor means can include also a body portion 43 extending chiefly to one side of the rack portion and adapted to be shifted to and fro due to gearing movement so as to shield bright light from a line of vision of an operator and/or passenger within a passenger compartment of the vehicle.

It is apparent in the illustration of FIGURE 1 that the switch arm 31 can be moved also to a neutral or normal position $31_n$ as well as the "up" and "down" positioning. This switch arm 31 is preferably connected to the source or battery 21 directly rather than through the arming switch 32 for the automatic visor means control system operation. Thus it is possible for a vehicle operator or passenger to have remote control directly as to "up" and "down" energization of the visor means 40. The automatic visor means operation occurs when the switch arm 32 is closed and power is supplied from the source or battery 21 through a first conductor means 44 to a juncture or wiring connection between the amplifier circuitry and plunger or contact arm 34. Simultaneously, a rectifier means 45 in an interconnection 46 blocks supply of energy to a juncture connected to the plunger or switch arm 24. Power supplied to switch arm 24 however, when the headlight switch 22 is closed, can simultaneously pass by way of the rectifier means 45 so as to energize the visor operating system even after dark in the event the need arises for such visor use. Occasionally the glare of lights is such that use of visors may be desired simultaneously while headlights are also in use such as at dawn or dusk or even after dark. It is to be noted that the purpose of the rectifier means is to preclude automatically controlled headlight energization during daytime actuation of the automatic visor operating system. Rectifier means 45 thus avoids possibility of unwanted daytime high and low beam automatic headlight energization which would be both undesirable and unnecessary. However, during dark periods the manual headlight switch 22 can be closed so that movement of the headlight switch arm 24 to contact 27 during automatic headlamp control operation will result in energization of only lower beam lighting while movement of the switch arm 24 into engagement with contact 28 will effect "bright" light energization in a well known manner.

In addition to the direct operator control of the visor means by operation of the switch arm 31, it is possible for the visor "arming" switch 32 to be closed by the operator so as to permit automatic lowering of the visor means 40 due to energization by engagement of contact 35. Similarly, when brightness of light entering the lens 11 to the photo tube unit 10 is below a predetermined setting of the adjustable control portion 12, the solenoid or coil 25 will be de-energized and the switch arm 34 can return to an opposite position in engagement with contact 36 which effects reverse operation of the motor means 37 thereby raising the visor means 40 including the main body portion 43 thereof into a retracted position below the roof portion 7. It is to be noted that the body portion 43 of the visor means can have a curved configuration to accommodate possible contouring of the roof portion 7 as well as the windshield 6.

Figure 2:
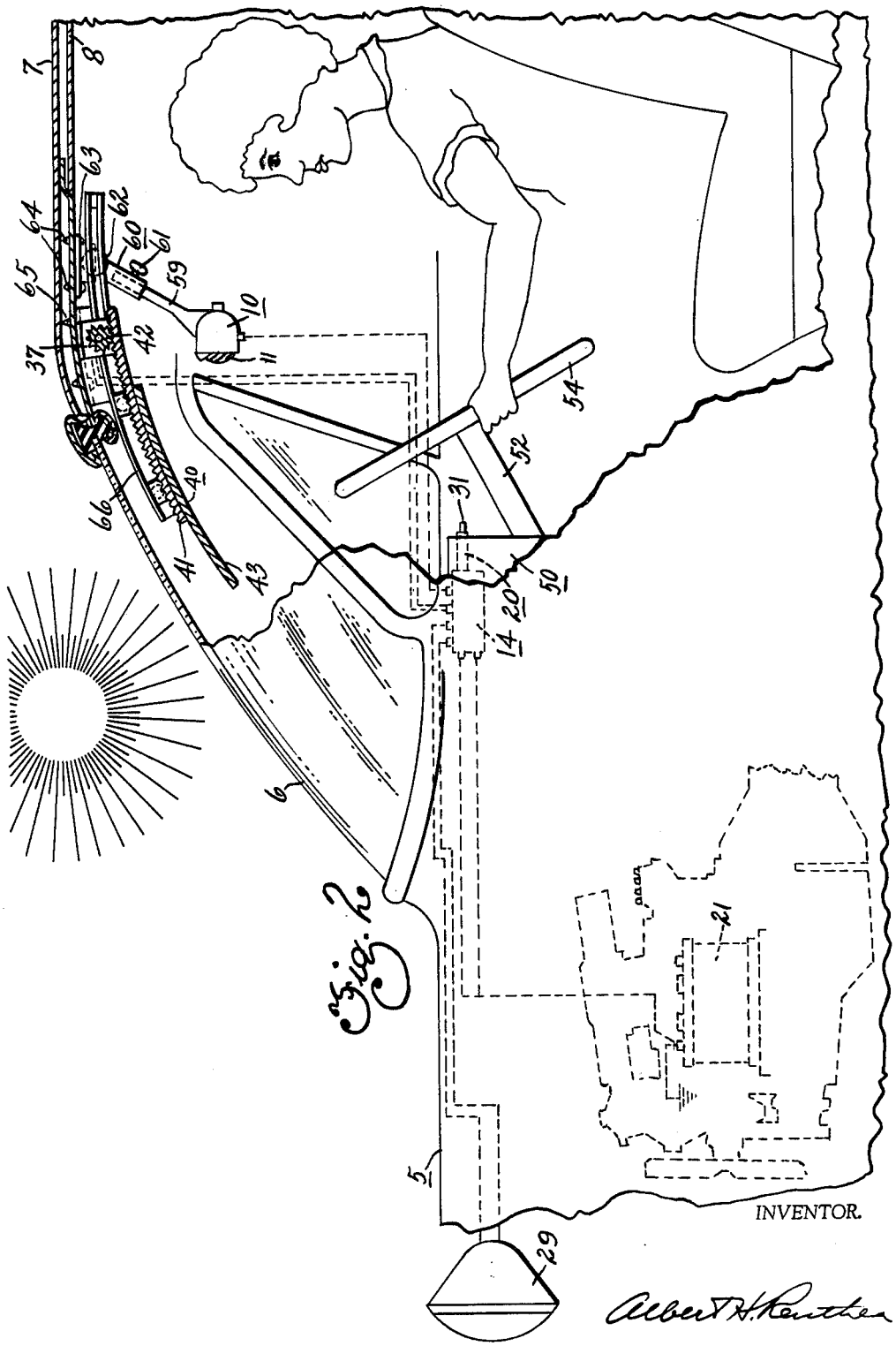
FIGURE 2 is another fragmentary and diagrammatic illustration of a vehicle having a substantially vertically adjustable photo cell or electronic pickup means and sensitivity control combined with a rack-and-pinion movable sunvisor means electrically driven and optionally energizable from a dashboard control switch means in accordance with the present invention.

Further detail of the installation can be seen in FIGURE 2 showing the amplifier means 14 mounted to one side of a dashboard means, generally indicated by numeral 50, on which the switch means 20 including visor switch arm 31 can also be provided. Reference numerals for corresponding components are used not only in FIGURE 2, but also in FIGURE 3, and reference can be made to the description for FIGURE 1 as to such components.

Figure 3:
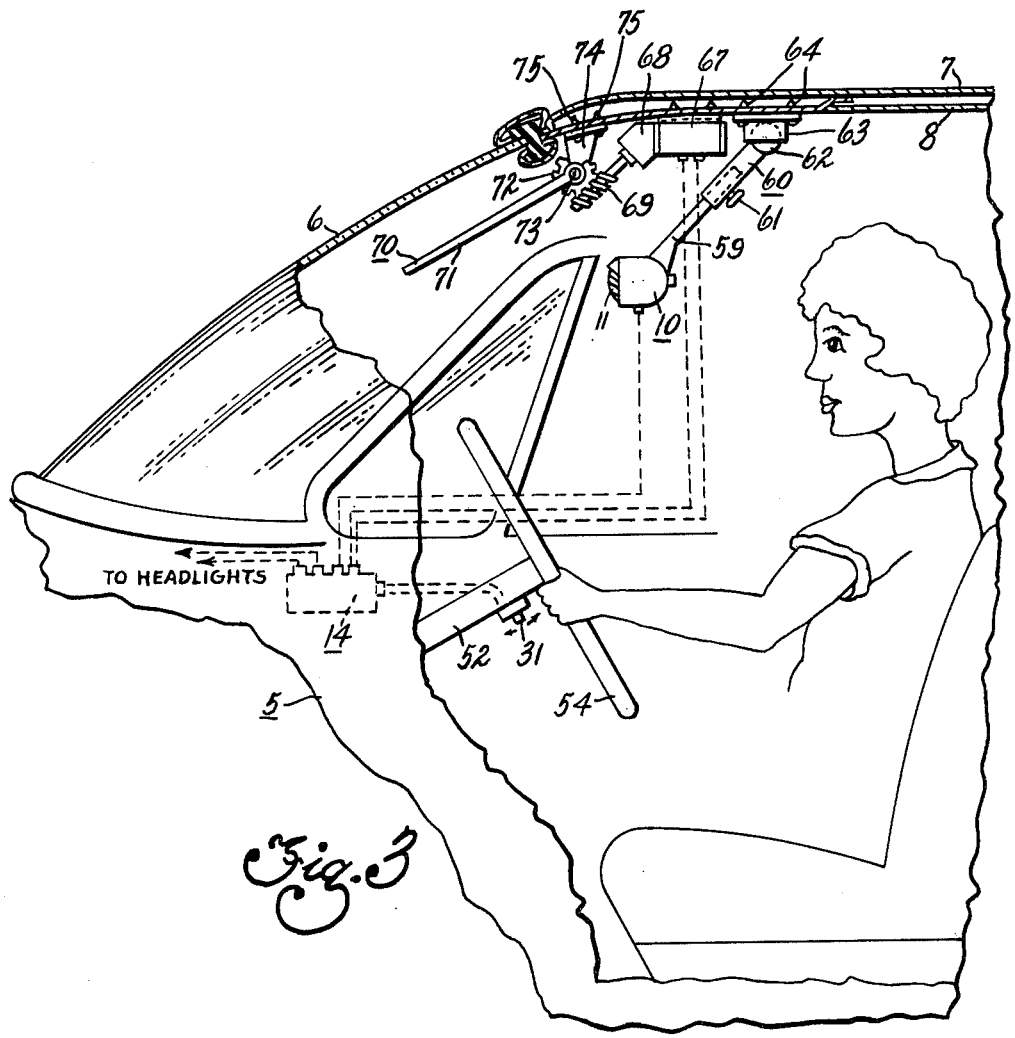
FIGURE 3 is a further embodiment illustrated in a fragmentary and diagrammatic view of a vehicle having a substantially vertically adjustable photo cell or electronic pickup means and sensitivity control combined with a worm-gearing movable sunvisor means electrically driven and optionally energizable from a steering column control switch means in accordance with the present invention.

It is to be understood that separate motor means 37 shown in FIGURE 1 can be provided for visor means on opposite sides of the interior of a vehicle. When opposite sides are fitted with individual motor means 37, it is possible to provide individual remote-control movable switch arms 31 for each of the opposite sides to permit individual visor operation according to the needs and liking of an operator and/or passenger. An example of a switch structure usable for the movable switch arm 31 can be seen in a U.S. Patent 2,919,315, Woofter, issued December 29, 1959 to the assignee of the present invention. Such switch means can be also mounted along one side of a steering post housing 52 as shown in FIGURE 3 so as to be readily accessible to hands on a steering wheel 54. It is noted that a lengthened switch arm can be provided to terminate adjacent to periphery of the steering wheel 54 and thus the visor control can be readily actuated and reached from a shadowy location out of line with the entry of glary light and thus easier to find.

In both views of FIGURES 2 and 3 there can be seen a further feature to have the photo tube unit 10 held by a substantially vertically suspended support 59 subject to predetermined poositining thereof in accordance with entry of bright light from the sun at an angle above the roof portion 7. Thus the support 59 can have a telescopic fit as to an adjustment means, generally indicated by numeral 60, including both a set screw 61 with an enlarged handle portion as well as a ball portion 62 adjustably held and positioned with a socket portion 63 secured by fasteners 64 to an inner brace of the roof portion 7. Similarly, the motor means 37 can be secured by a fastener 65 to this roof portion brace as indicated in FIGURE 2 and a track or slide portion 66 can accommodate to and fro movement of the visor means including the body portion 43 thereof as the rack portion 41 is drivingly engaged by gearing or pinion 42.

In FIGURE 3 there is a slightly modified arrangement including a motor means 67 having a gear box 68 therewith to drive a worm gear 69 such that a visor means, generally indicated by numeral 70, and including a visor body portion 71, can be moved pivotally by engagement of a fragmentary gearing 72. This gearing 72 as well as the visor body portion 71 can be mounted on a shaft or rod 73 providing an axis about which pivotal movement of the visor means body portion 71 occurs subject to support of the visor means by a bracket 74 held by fasteners 75 to a brace or bracket of the roof portion 7.

Figure 4:
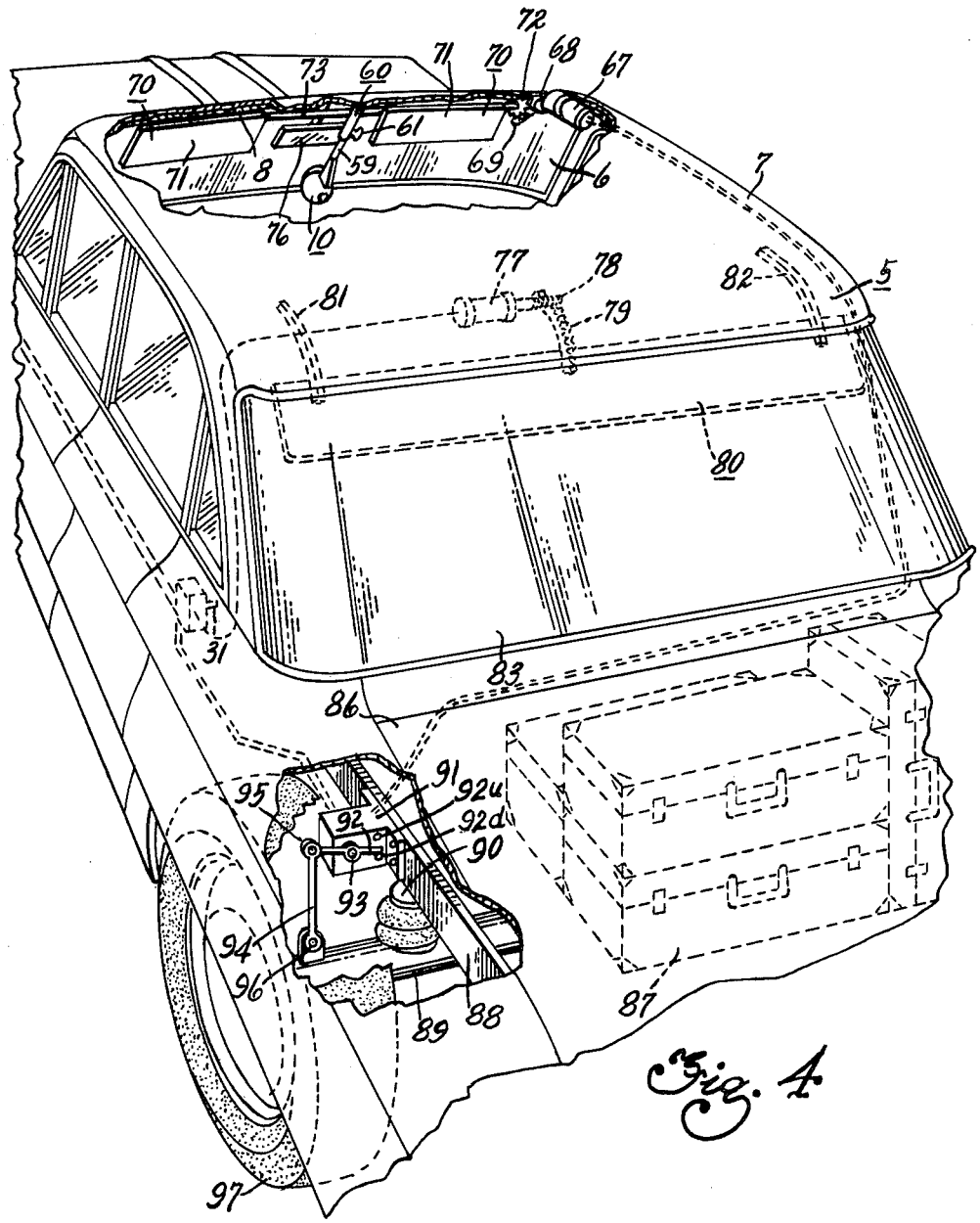
FIGURE 4 is an embodiment illustrated in a fragmentary and diagrammatic view of a vehicle having a ride-height responsive switch means between an unsprung vehicle mass and a loaded sprung mass so that this switch means can effect electrical energization of motorized sunvisor means movable to and fro in accordance with the present invention.

Use of the shaft or rod 73 can be shared by a pair of such visor means 70 as shown in FIGURE 4 such that the rod or shaft 73 extends substantially transversely of the vehicle passenger compartment along an underside of the roof portion 7 and behind the frame for the windshield 6. This rod or shaft 73 can be above a centrally located mirror means 76 and the adjustable support 59–60 for the pickup or photo cell unit 10 can be located centrally also adjacent to the mirror means 76.

It is to be understood that a switching device having a movable member such as 31 can be provided also for rear passenger compartment use as indicated in FIGURE 4 subject to energization of a reversible motor means 77 having a worm gear or gearing 78 engaging a toothed segment or rack portion 79 attached to a rear visor means generally indicated by numeral 80. This rear visor means can also utilize track or slide support portions 81 and 82 on opposite sides of the vehicle. Similar visor means could be provided also for the side windows of a vehicle. Use of the rear visor means 80 can permit a shielding against entry of bright sunlight through a rear window 83 having a substantial transparent area. By providing a shield for the rear window, it is possible to shade the rear of the head of passengers in the back seat thereby increasing comfort and reducing entry of heat through the rear window.

In FIGURE 4 there is further shown a luggage or storage compartment 86 of the vehicle which can be fitted with a load 87 tending to lower positioning of a frame or sprung mass 88 relative to an axle or unsprung mass 89 between which metal or pneumatic spring means 90 can be provided. Since a heavy loading in a luggage compartment of a vehicle can result in a lowering of that end of the vehicle so loaded and such loading may not necessarily be compensated for by spring means 90, it is possible to provide a ride-height-type switch means 91 including a lever 92 pivotally movable as to a shaft or rod 93 in accordance with actuation thereof by way of a link or lever arm 94. This link or lever 94 can be journaled at 95 to the switch arm 92 and at 96 to the axle or unsprung mass 89 relative to which a wheel 97 is journaled in the usual manner. Thus decrease in clearance height between the sprung and unsprung masses can result in an upward movement of the link 94 such that that switch arm will engage a "down" contact $92_d$. Similarly when the load is decreased in the luggage compartment, the link 94 will pull the switch arm for pivotal movement such that an "up" contact $92_u$ is engaged. Thus the visor means can be tied to this switch means 91 by a suitable wiring connection directly to front motor means 67 as well as across contacts of switching member 31 supplemented thereby in FIGURE 4. Actuation of switch means 91 in FIGURE 4 is supplemental to operation of switch member 31 in the circuitry of FIGURE 1. Therefore whenever the ride-height clearance decreases the link 94 can move upwardly so as to cause the lever arm 92 to engage the "down" contact thereby lowering the visor means such as 70 by energization of motor means 67. Thus the change angle of the sprung mass as to the unsprung mass in accordance with loading 87 can be compensated for, and the visor means 70 can be actuated for lowering of the body portion 71 thereof since there is a difference in the angular direction in which bright sunlight will enter an upper portion of the windshield 6 whenever such greater loading occurs at the rear of a vehicle for example. As to the structure of the switching device 91, reference can be made to a Patent 2,921,160—Lautzenhiser, issued January 12, 1960 to the assignee of the present invention. As noted earlier, the switching member 31 represented in circuitry of FIGURE 1 is also identified in differing locations of FIGURES 2, 3 and 4 and each can be similar in structure to a window-lift-type switch means of Patent 2,919,315—Woofter, issued December 29, 1959 or as shown by the copending application, S.N. 141,483—Baer et al., filed September 28, 1961 and belonging also to the assignee of the present invention.

While the embodiments of the present invention as herein disclosed, constitute preferred forms, it is to be unerstood that other forms might be adopted.

What is claimed is as follows:

1. In combination on a vehicle having a sprung mass including a body with a roof portion and an unsprung mass including a spring means therebetween adjacent to a load-carrying compartment, a switching means mounted on said sprung mass and having a pair of contacts with circuit connections thereto as well as a switch arm movable therebetween, an articulated linkage interconnecting said unsprung mass and said switch arm so that change in clearance height due to change in compartment loading can effect switch arm movement, a motor means supported by the roof portion adjacent to a windshield area and also having structural circuit connection thereto electrically energizable in response to predetermined contact engagement by said switch arm, and a visor means mechanically driven by said motor means into various positioning in a range between retraction out of line of vision as well as into vision-shielding location in accordance with change of angulation of bright light through the windshield due to change in vehicle loading.

2. In combination on a vehicle having headlight means and energy source therewith, a motorized visor means movable into various positioning in a predetermined range between retraction as well as selectively into glare-shielding location as to a particular vehicle direction in response to electrical energization of said motorized visor means from a vehicle energy source such as a battery, an automatic control means having circuitry for headlight dimming at night as well as for visor means operation exclusively during daylight, and a selective sensitivity setting means adjustable for day-night operation so that said control means triggers electrically motorized operation of said visor means in response to differing conditions of glare encountered at night and during daylight.

3. In combination on a vehicle having an energy source therewith, a motorized visor means movable into various positioning in a range between retraction as well as selectively into glare-shielding location as to a particular vehicle direction in response to electrical energization thereof from the vehicle energy source, an automatic control means having circuitry utilized both automatically as well as by manual override switching both during daylight and at night in energization of said vistor means, said control means including a photo tube means in a predetermined sensitivity bright light location, amplifier and automatic relay means for retraction and glare-shielding actuation of said motorized visor means, and a manually operable switch means having neutral as well as retraction and glare-shielding actuation positioning for remote-control selective energization of said motorized visor means to that effected by said automatic control means, said photo tube means having a resistive impedance sensitivity setting portion that controls compensation of light brightness in response to differing conditions of glare encountered at night and during daylight.

4. The combination of claim 3 wherein said photo tube means is carried by a telescopic support means secured to the vehicle and substantially vertically adjustable in physical positioning as to angulation of entry of bright light in response to differing conditions of glare encountered at night and during daylight.

5. The combination of claim 3 wherein said photo tube means is carried by a telescopic support means pivotally secured to the vehicle by a ball joint socket means adjustable in positioning at one end, said telescopic means centrally having adjustable vertical height positioning thereof variably set independent of said ball joint socket means as to angulation of entry of bright light in response to differing conditions of glare encountered at night and during daylight.

6. The combination of claim 3 wherein said motorized visor means mechanically includes a rack and pinion operable during energization of said motorized visor means into various positioning in the range between retraction and glare shielding location and said photo tube means sensitivity setting portion accessible for adjustment between differing glare conditions.

7. The combination of claim 3 wherein said motorized visor means mechanically includes a worm gearing operable during energization of said motorized visor means pivotally journaled therewith into various positioning in the range between retraction and glare-shielding location and said photo tube means sensitivity setting portion accessible for adjustment between differing glare conditions.

8. In combination on a vehicle having a roof portion and seating compartment with transparent viewing areas, a source of electrical energization, a load-height responsive switch means having opposite contacts, a reversible electric motor means carried by said roof portion and having wiring interconnection with said load-height responsive switch means, a visor means movably mounted adjacent to transparent viewing areas of the seating compartment, and a force-transmitting mechanical connection between said motor means and said visor means, said load-height responsive switch means having a location adjacent to a load-carrying area of the vehicle and having said contacts engaged in accordance with change of angulation due to change in vehicle loading.

9. The combination of claim 8 wherein said load-height responsive switch means is mounted on a vehicle sprung mass portion, said load-height responsive switch means having a pivotally mounted switch arm engageable with said contacts at one end and journaled at an opposite end to a link secured to a vehicle unsprung mass portion so that difference in height between sprung and unsprung mass portions effects energization of said motor means for predetermined movement of said visor means.

10. The combination of claim 8 wherein said load-height responsive switch means is mounted on a vehicle frame portion in a location adjacent to a load-carrying compartment, said load-height responsive switch means having a movable switch arm engageable with said contacts due to shift in position thereof under force transmitted by a link between sprung and unsprung masses to effect energization of said motor means for predetermined movement of said visor means.

11. The combination of claim 8 wherein said visor means has in addition thereto a further rear visor structure and motor means therewith carried adjacent to a rear window means and additional switch means mounted along a side of the seating compartment, said additional switch means having connection for remote control energization of said further motor means to effect movement of said rear visor structure both for heat and glare shielding.

12. In combination on a vehicle having a roof portion and seating compartment with transparent viewing areas including a windshield, a source of electrical energization, a control switching device mounted within the vehicle and connectable with said source, a plurality of visor means carried by the roof portion and movable into various positioning in a range between retraction as well as into glare-shielding location adjacent to said windshield, a rod-like shaft means journaling each of said visor means, gearing provided on said shaft means, a motor means mounted along said roof portion and having a driving connection to said gearing subject to actuation for selective change in positioning of said visor means in common with each other upon operation of said control switching device, and a selective brightness sensitivity setting control means adjustable for day-night operation so that said control means triggers electrically motorized visor means operation as well as additional height-load responsive switch means that actuates said visor means in accordance with change of angulation due to change in vehicle loading.

13. In combination on a vehicle having a roof portion and seating compartment with transparent viewing areas including windshield, a source of electrical energization, a control switching device mounted within the vehicle and connectable wtih said source, a plurality of visor means carried by the roof portion and movable into various positioning in a range between retraction as well as into glare-shielding location adjacent to said windshield, a rod-like shaft means journaling each of said visor means, gearing provided on said shaft means, a motor means mounted along said roof portion and having a driving connection to said gearing subject to actuation for selective change in positioning of said visor means in common with each other upon operation of said control switching device, a selective brightness sensitivity setting control means adjustable for day-night operation so that said control means triggers electrically motorized visor means operation as well as additional height-load responsive switch means that actuate said visor means in accordance with change of angulation due to change in vehicle loading, said visor means being divided centrally into a pair of adjacent portions and further a rear view mirror means being mounted centrally between said pair of adjacent portions of said visor means, said control means including a centrally located photo tube means suspended from the roof portion rearwardly of said mirror means, and an amplifier means joined electrically with said photo tube means as well as automatic relay switching means supplementing said switching device for control of electrical energization of said motor means for change in positioning of said visor means.

14. The combination of claim 13 wherein said photo tube means is carried by a telescopic support means secured to the vehicle by a ball joint socket means adjustable in positioning at one end, said telescopic support means centrally having a set screw adjustable for vertical height positioning thereof variably independent of said ball joint socket means as to differing day and night glare conditions ecountered.

15. The combination of claim 13 wherein said additional height-load responsive switch means having opposite contacts and being mounted on a vehicle sprung mass portion, said additional height-load responsive switch means having a pivotally mounted switch arm engageable with said contacts at one end and journaled at an opposite end to a link secured to a vehicle unsprung mass portion so that difference in height between the sprung and unsprung mass portions effects energization of said motor means for movement of said visor means into various positioning in the range between retraction as well as into glare-shielding location.

16. The combination of claim 13 wherein said additional height-load responsive switch means having opposite contacts and being mounted on a vehicle frame portion in a location adjacent to a load-carrying compartment, said height-load responsive switch means having a movable switch arm engageable with said contacts due to shift in position thereof under force transmitted by a link between sprung and unsprung masses to effect energization of said motor means for movement of said visor means into various positioning in the range between retraction as well as into glare-shielding location.

17. The comibnation of claim 13 wherein said plurality of visor means includes a rear portion carried adjacent to a rear window means and additional switch means mounted along a side of the seating compartment, said additional switching means having connection for remote-control energization of said motor means to effect movement of said rear portion of said plurality of visor means both for heat and glare shielding.

18. In combination on a vehicle having a roof portion and seating compartment with transparent viewing areas including a windshield, source of electrical energization, visor means carried by the roof portion and movable into various positioning in a range between retraction as well as into glare-shielding location adjacent to said windshield, a motor means mounted along said roof portion and operably connected to said visor means subject to actuation for selective change in positioning of said visor means, a movable photo tube means mounted adjacent to said windshield, an amplifier means joined electrically to said photo tube means as well as automatic relay switching means having contact portions operatively connected at least in part for control of electrical energization of said motor means for change in positioning of said visor means and having contact portions operatively connected to circuitry in part for headlight energization in differing intensity.

19. The combination of claim 18 wherein manually operable headlight switching means and visor switching means are connected between said source and said amplifier means, and a one-way electrical rectification portion in circuit connection between said amplifier means and said headlight switching means, said one-way rectification portion precluding headlight energization upon de-energization setting of said headlight switching means for only visor means energization during daylight though conversely said rectification portion has both said visor means and headlight automatic control readily energized through circuitry upon energization setting of said headlight switching means.

20. On a vehicle having a sprung mass including a body with a roof portion and an unsprung mass including a sprung mass therebetween adjacent to a load-carrying compartment, the vehicle also having a motor means supported by the roof portion and a power source therefor as well as visor means mechanically driven by the motor means into various positioning in a range between retraction as well as into glare-shielding location, the improving therewith which comprises a height-load responsive device having a location adjacent to a load-carrying area of the vehicle and having a contact arm movable responsive to change of height between the sprung and unsprung masses so as to interconnect the power source and motor means that accomplishes visor means positioning in accordance with change of angulation due to change in vehicle loading.

References Cited by the Examiner
UNITED STATES PATENTS

| | | | |
|---|---|---|---|
| 1,572,038 | 2/1926 | Reinheimer | 296—97 |
| 1,854,892 | 4/1932 | Ewend | 296—97 |
| 1,981,261 | 11/1934 | Baden | 296—97 |
| 2,013,560 | 9/1935 | Hacker | 296—97 |
| 2,279,011 | 4/1942 | Nicholson | 296—97 X |
| 2,607,906 | 8/1952 | Sang | 296—97 |
| 2,638,377 | 5/1953 | George | 296—97 |
| 2,829,003 | 4/1958 | Moyes | 296—97 |

BENJAMIN HERSH, *Primary Examiner.*

A. HARRY LEVY, *Examiner.*